US009110762B2

(12) United States Patent
Russinovich et al.

(10) Patent No.: US 9,110,762 B2
(45) Date of Patent: Aug. 18, 2015

(54) VIRTUAL MACHINE-PRESERVING HOST UPDATES

(71) Applicant: Microsoft Corporation, Redmond, WA (US)

(72) Inventors: Mark Eugene Russinovich, Clyde Hill, WI (US); Melur K. Raghuraman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 344 days.

(21) Appl. No.: 13/693,532

(22) Filed: Dec. 4, 2012

(65) Prior Publication Data

US 2014/0157264 A1 Jun. 5, 2014

(51) Int. Cl.
*G06F 9/44* (2006.01)
*G06F 9/455* (2006.01)
*G06F 9/445* (2006.01)

(52) U.S. Cl.
CPC .. *G06F 8/67* (2013.01); *G06F 8/65* (2013.01); *G06F 9/455* (2013.01); *G06F 9/45533* (2013.01); *G06F 9/44* (2013.01); *G06F 2009/45575* (2013.01)

(58) Field of Classification Search
None
See application file for complete search history.

(56) References Cited

U.S. PATENT DOCUMENTS

| 2003/0074487 | A1 | 4/2003 | Akgul et al. |
| 2007/0061372 | A1 | 3/2007 | Appavoo et al. |
| 2011/0066786 | A1 | 3/2011 | Colbert |
| 2012/0030669 | A1 | 2/2012 | Tsirkin |
| 2012/0042034 | A1 | 2/2012 | Goggin et al. |
| 2012/0066677 | A1 | 3/2012 | Tang |
| 2012/0195187 | A1* | 8/2012 | Ashihara et al. ............... 370/220 |
| 2014/0130040 | A1* | 5/2014 | Lemanski ........................ 718/1 |

FOREIGN PATENT DOCUMENTS

EP 2508990 A1 10/2012

OTHER PUBLICATIONS

"International Search Report & Written Opinion for PCT Application No. PCT/US2013/072680", Mailed Date: Mar. 3, 2014, Filed Date: Dec. 2, 2013, 9 Pages.

Baumann, et al., "Reboots are for Hardware: Challenges and Solutions to Updating an Operating System on the Fly", in USENIX Annual Technical Conference, Jun. 17, 2007, pp. 337-350.

(Continued)

*Primary Examiner* — Qing Wu

(74) *Attorney, Agent, or Firm* — Ben Tabor; Kate Drakos; Micky Minhas

(57) ABSTRACT

Techniques are described for updating a host operating system on a server while maintaining virtual machines running on the server. An updated host operating system is copied to the server. The currently active host operating system freezes the virtual machines but leaves them resident in RAM. The allocations and state for each virtual machine is copied to RAM or local storage. The active host operating system is shut down. Instead of issuing a command to reboot the server after it finishes shutting down, the active host operating system transfers execution to a loader. The loader reads the kernel of the updated host operating system into RAM along with an allocation map for the virtual machines and instructions to resume the virtual machines. The loader transfers execution to the updated host operating system entry point, and the updated host operating system loads the states of the virtual machines and resumes them.

20 Claims, 4 Drawing Sheets

(56) References Cited

OTHER PUBLICATIONS

Salfner, Felix, et al. "Dependable Estimation of Downtime for Virtual Machine Live Migration," International Journal on Advances in Systems and Measurements, (downloaded from: http://www.thinkmind.org/download.php? articleid=sysmea_v5_n12_2012_7), Jun. 30, 2012, pp. 70-88, vol. 5, No. 1&2.

Salfner, Felix, et al., "Downtime Analysis of Virtual Machine Live Migration," in the proceeding of the Fourth International Conference on Dependability, Depend 2011, Aug. 21, 2011, pp. 100-105.

Unknown, Suspending and Pausing a Virtual Machine, (downloaded from: http://download.parallels.com/desktop/v4/docs/en/Parallels_Desktop_Users_Guide/22834.htm on Oct. 26, 2012), (date unknown), (1 page).

Phaneendra, K. et al., "Parameter Dependent Performance Optimization in Live Migration of Virtual Machine," International Journal of Modern Engineering Research (IJMER), Jul.-Aug. 2012, pp. 1564-1571, vol. 2, Issue 4.

Clark, Christopher et al., "Live Migration of Virtual Machines," NSDI '05: 2nd Symposium on Networked Systems Design & Implementation, Jun. 27, 2005, (14 pages).

* cited by examiner

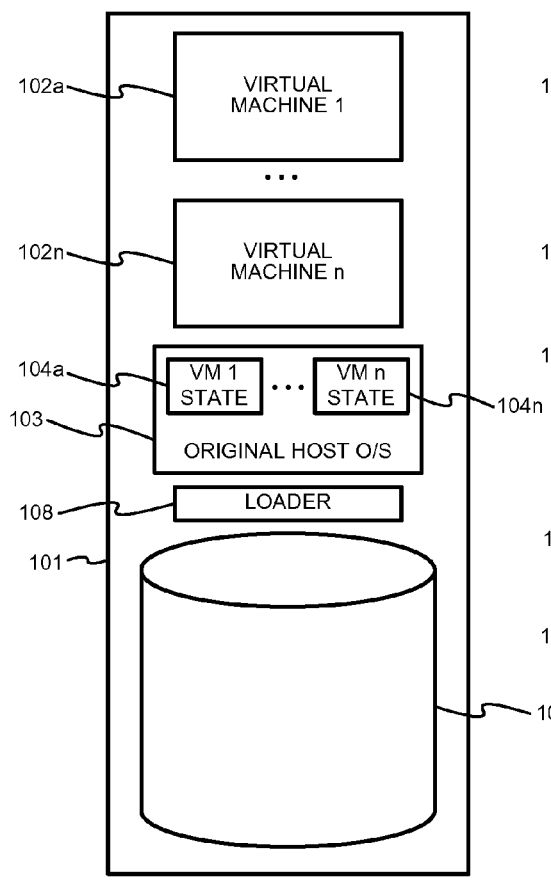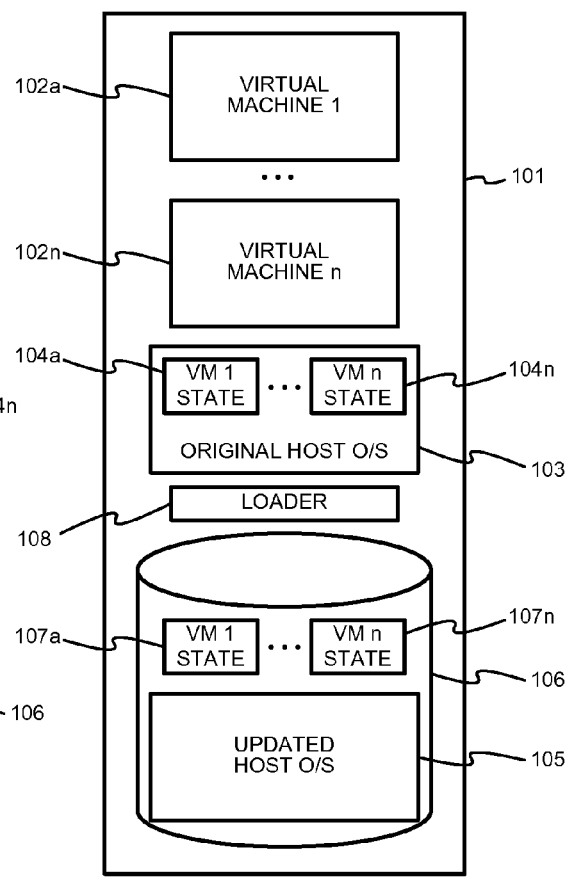
*FIG. 1*         *FIG. 2*

VIRTUAL MACHINE-PRESERVING HOST UPDATES

BACKGROUND

Rebooting an operating system involves shutting down the running operating system and immediately starting it. There are several reasons for rebooting an operating system. For example, hardware maintenance and upgrades typically require the operating system to be offline before the hardware can be modified. More frequently, a reboot is required to apply code and configuration updates, and the operating system cannot adopt these updates without restarting.

Rebooting the operating system disrupts the applications running on the system, which must close client connections, commit their state to storage, and shut down. During the restart, those applications must then restore their state, rebuild memory caches, and resume accepting client connections. These disruptions are magnified in a virtualized environment because the reboot affects not only the applications operating on a host partition, but also the applications running on the hosted virtual machines.

During a reboot, applications running on a virtual machine will be offline during the time required to: shut down the virtual machine, shut down the host, run firmware Power-on Self-Test (POST), startup the host, startup the virtual machine, and startup the application. In some cases, the duration of this outage may be on the order of thirty minutes or more. If a Service Level Agreement (SLA) requires a specific availability for the application, the downtime caused by host operating system reboots will consume at least a portion of the SLA's downtime budget. This will leave less time in the SLA downtime budget for unplanned outages, which are unpredictable in terms of frequency and duration.

In a cloud environment, services typically require at least two virtual machines running on separate host servers to meet a compute-availability SLA. Using multiple, distributed virtual machines allows the cloud platform to update a first server hosting a first virtual machine while a second virtual machine continues to run on a second server. The second server may be updated after the updated first virtual machine is running again. However, the virtual machines on the rebooted servers lose in-memory caches. In the cloud environment, reboot downtime results in reduced capacity rather than a complete outage. Additionally, if only two virtual machines are used to support a service, then there is a risk of a complete outage during an update. For example, while one server is being updated, the virtual machine on that host is unavailable and, if the server hosting the other virtual machine fails during the update, then the other virtual machine will also be unavailable.

The end-to-end update of a cluster, which may include approximately one thousand servers, takes 12-24 hours depending upon the topology of deployed services, any server failures caused by the hardware reset during the reboot, and the length of time it takes to shut down virtual machines. Unless all of the servers are updated concurrently, which is likely to violate customer SLAs, the cluster's configuration is inconsistent during the end-to-end update and the cluster is likely exposed to the security and reliability issues fixed with the update.

While scale-out PaaS services have reduced capacity during the update, services that have tiers consisting of a single virtual machine—which includes the vast majority of IaaS-based tiers—experience a complete outage. Using thirty minutes as the time a virtual machine is offline during an update, updating once per month allows for only 2.75 hours of unplanned downtime over a year for an application with a 99.9% yearly availability SLA. Given the run rate of software and hardware incidents and variability of update times and unplanned outage mean time to detect (MTTD) and mean time to resolve (MTTR), it's unlikely the platform can meet that SLA for a very high percentage of customers with a monthly update.

To mitigate the impact of host-caused reboots on virtual machines, most small-scale virtualization platforms have implemented live migration, which enables virtual machines to seamlessly move from one server to another in order to avoid a host's planned reboot. The downsides of live migration are that it adds significant complexity to overall system management, places a burden on networking resources, and extends the time required to apply updates. Rebooting a group of servers requires migrating every virtual machine at least once. And unless an empty server is paired with every one hosting virtual machines that will be migrated, the migration of virtual machines becomes a tile shuffle game and server updating can become a serial operation.

Virtual machine suspend-update-resume (VM-SUR) is an alternative to shutting down virtual machines based on existing virtual machine technology. With this approach, the host OS suspends virtual machines, saves their state (including RAM and virtual CPU) to disk, restarts the server into the updated host OS, and then resumes the virtual machines. This allows virtual machines to retain their in-memory caches and avoids virtual machine shutdown and restart. The drawback of VM-SUR is that the RAM of all virtual machines hosted on a server must be read and written to local storage as part of the host OS update, during which time the virtual machines are suspended. Using approximate numbers that reflect contemporary cloud hardware, the save and restore of 100 GB of RAM to local storage that has throughput of 100 MB/s would take about thirty minutes. That disruption is no better than that caused by a typical shutdown/restart and while virtual machines retain their caches, the downtime would be long enough to cause a visible outage for single-instance virtual machines.

Because the surrounding application state may drastically change in the interim, the host would still be obligated to give virtual machines the opportunity to finish in-flight work and gracefully prepare, adding to the downtime. Assuming a 10× throughput improvement for local storage, the update duration is still at least three minutes, well beyond most client timeouts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A virtual machine-preserving host update technique minimizes virtual machine downtime during host operating system updates by leaving virtual machines intact and suspending them only long enough to restart the host operating system. Embodiments leverage virtual machine save/resume technology and avoid saving and restoring the contents of RAM. This approach improves the availability of all virtual machines and is not limited to single-instance tiers.

In one embodiment, an updated host operating system is loaded on a computer system that is running one or more virtual machines. The computer system suspends all virtual machines running and records an allocation map and state for each of the virtual machines to RAM or local file storage. The virtual machines are left resident in RAM when they are suspended. The virtual machine caches may also be maintained while they are suspended.

The active host operating system is then shut down and execution is transferred to a loader. The loader reads a kernel of updated host operating system into RAM. In the invocation, the active host operating system passes an allocation map for the virtual machines to the updated operating system. The allocation map includes instructions to resume the virtual machines.

The state for each of the virtual machines is loaded by the updated host operating system. The updated host operating system then resumes operation of the virtual machines and the applications running on the virtual machines.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates a server hosting one or more virtual machines according to one embodiment.

FIG. 2 illustrates a server on which an updated host operating system image has been stored to memory.

DETAILED DESCRIPTION

Figures 3, 4:
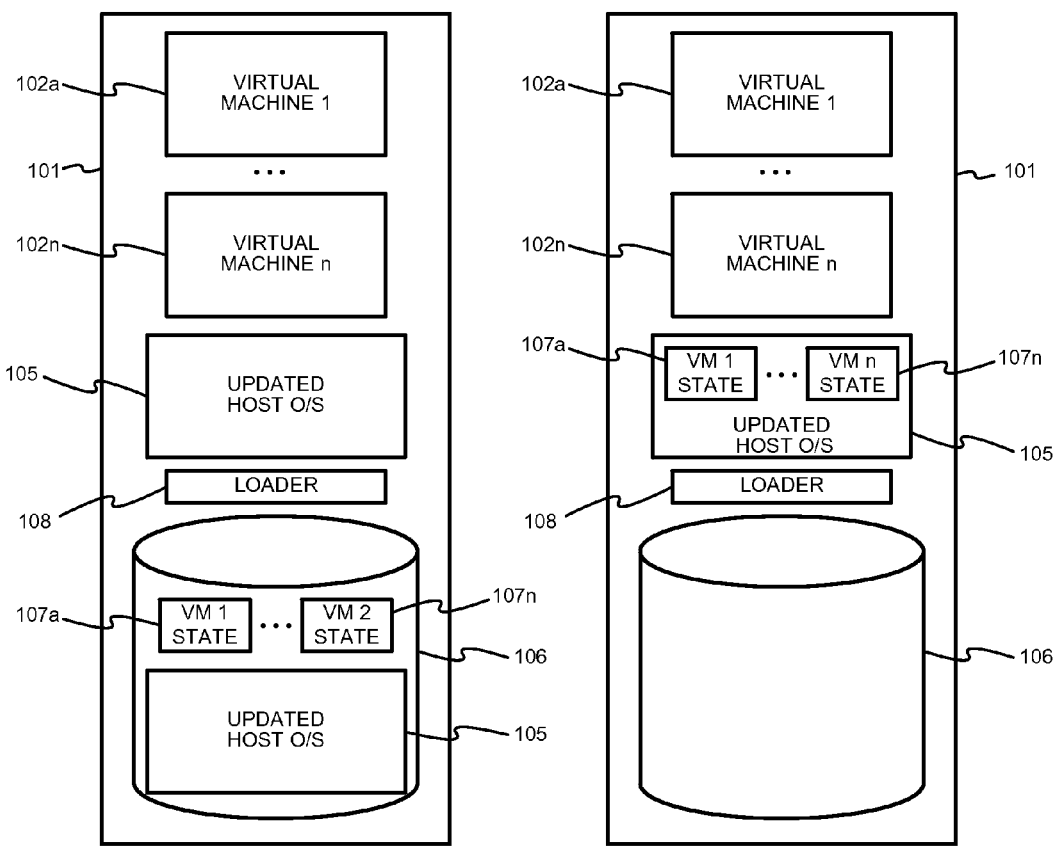
FIG. 3 illustrates a server after an active host operating system has been deleted and a loader has read a kernel of an updated host operating system into RAM.
FIG. 4 illustrates a server after a loader has transferred execution to an updated host operating system entry point.

FIG. 1 illustrates a server 101 hosting one or more virtual machines (VM) 102. Server 101 is running an active host operating system (O/S) 103, which supports virtual machines 102. Active host operating system 103 maintains a current state 104 for each virtual machine. Traditionally, when active operating system 103 is updated, applications on virtual machines 102 would have to be shut down, the virtual machine states 104 would be saved to memory, and then server 101 would be restarted after operating system 103 was updated. However, embodiments using a new host operating system servicing technique (referred to herein as Virtual Machine-Preserving Host Update (VM-PHU)) minimize virtual machine 102 downtime during active host operating system updates by leaving virtual machines 102 intact and suspending them only long enough to restart an updated host operating system.

In FIG. 2, an updated host operating system image (Updated Host O/S) 105 has been stored to memory 106. The active host operating system 103 freezes the virtual machines 102 but leaves them resident in RAM on server 101. Active host operating system 103 records the allocations and states 107 for virtual machines 102 either to RAM and/or to local storage 106. When active host operating system 103 shuts down as part of the operating system update, instead of issuing a command to reboot server 101, it transfers execution to loader 108.

In FIG. 3, loader 108 deletes active host operating system 103 that reads the kernel of updated host operating system 105 into RAM. Additionally, loader 108 passes an invocation from active host operating system 103 to updated host operating system 105 that includes an allocation map for the virtual machines 102 along with instructions to resume the virtual machines 102. The allocation map and other virtual machine information 107 may be saved, for example, in RAM, in files saved to disk, or in other server 101 storage.

In FIG. 4, loader 108 transfers execution to the updated host operating system 105 entry point. After updated host operating system 105 initializes, it loads states 107 for virtual machines 102 and resumes them. The VM-PHU technique avoids the stress on server 101 caused by hardware resets and, therefore, prolongs the lifetime of server 101.

The duration of the outage experienced by hosted virtual machines 102 when the VM-PHU technique is employed is limited to the time taken to shut down the active host operating system 103 and then to load and start the updated host operating system 105. The VM-PHU technique skips firmware POST and avoids virtual machine 102 shut down and restart. Applications running in the virtual machines 102 do not lose their state or caches. If the updated host operating system 105 is loaded fast enough, then the disruption may be short enough that applications running on virtual machines 102 and their respective clients are not aware of the outage. Instead, clients of the virtual machine applications may perceive what appears to be a long network glitch, which all network clients are already designed to handle. If the virtual machine outage is short enough, such as less than thirty seconds, standard load balancer probe timeouts will not trigger thereby keeping the virtual machines 102 in rotation to pick up work as soon as they resume.

Even if the outage during a VM-PHU update is long enough to require virtual machine application awareness, this approach still provides a benefit because the downtime for VM-PHU is a fraction of the standard host operating system update. Accordingly, the VM-PHU downtime savings can be applied to availability SLAs to provide additional time in the unplanned downtime budget.

In other embodiments, the VM-PHU technique may be extended to support firmware upgrades if POST times are reduced to a few seconds and if the firmware does not modify RAM for self-test or reset unless instructed. Transferring virtual machine RAM allocation across a hardware reboot requires persisting the information to disk or saving it in a well-known RAM location, such as an ACPI Static Resource Affinity Table (SRAT).

Figure 5:
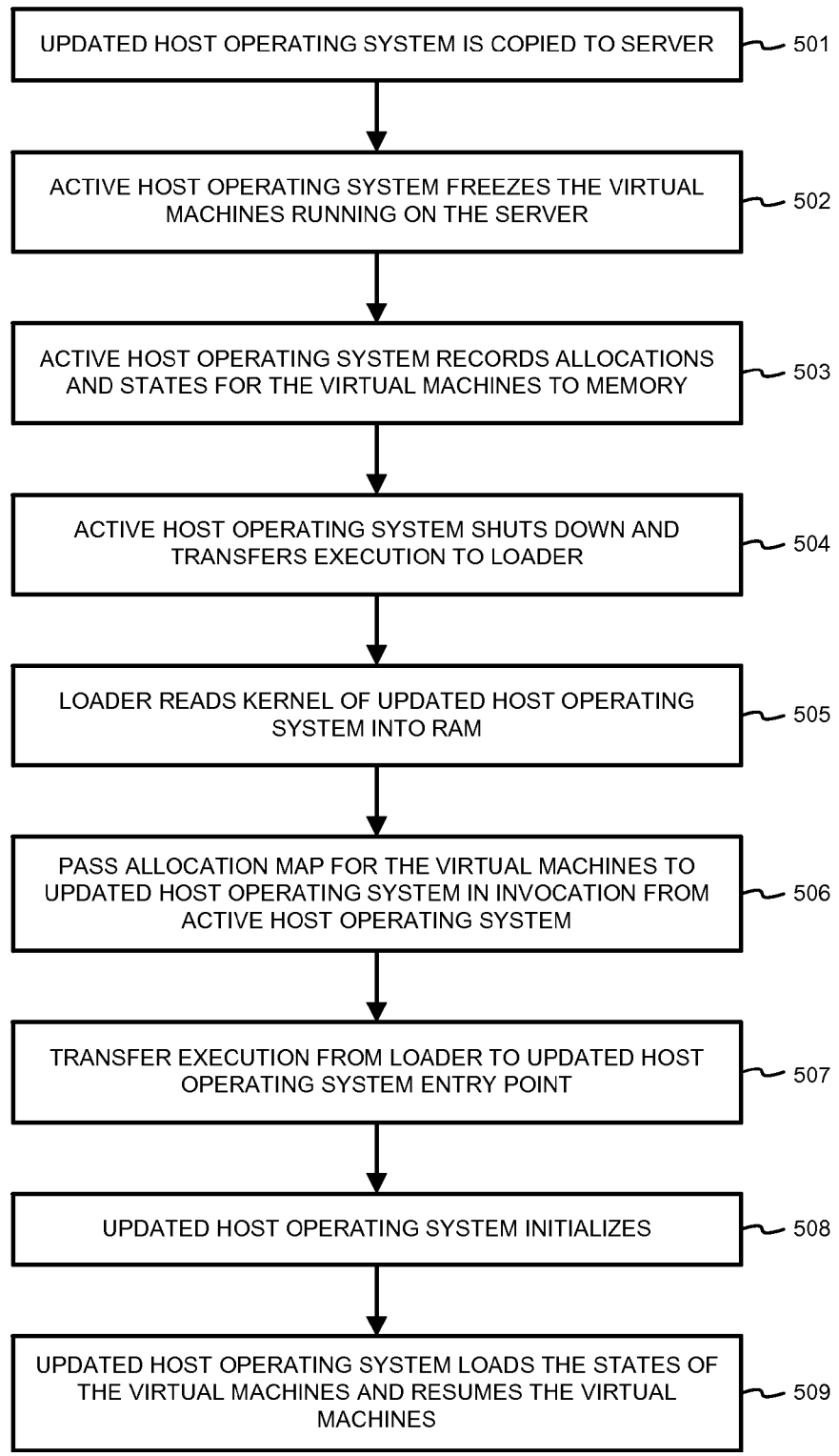
FIG. 5 is a flowchart illustrating a process or method for updating a host operating system while preserving the virtual machines running on a host server.

FIG. 5 is a flowchart illustrating a process or method for updating a host operating system while preserving the virtual machines running on a host server. In step 501, an updated host operating system is copied to RAM or local storage on the server. In step 502, the active host operating system freezes the virtual machines currently running on the server. In step 503, the active host operating system records allocations and states for the virtual machines to RAM or local storage. In step 504, the active host operating system then shuts itself down and transfers execution to a loader application.

In step 505, the loader reads the kernel of the updated host operating system into RAM. In step 506, the invocation from the active host operating system passes an allocation map for the virtual machines to the updated host operating system along with instructions to resume the virtual machines. In step 507, execution is transferred from the loader to updated host operating system entry point.

In step 508, the updated host operating system is initialized. Finally, in step 509, the updated host operating system loads the states of the virtual machines and resumes the virtual machines.

It will be understood that one or more steps 501-509 of the process illustrated in FIG. 5 may be executed simultaneously and/or sequentially. It will be further understood that each step may be performed in any order and/or may be performed once or repetitiously.

Figure 6:
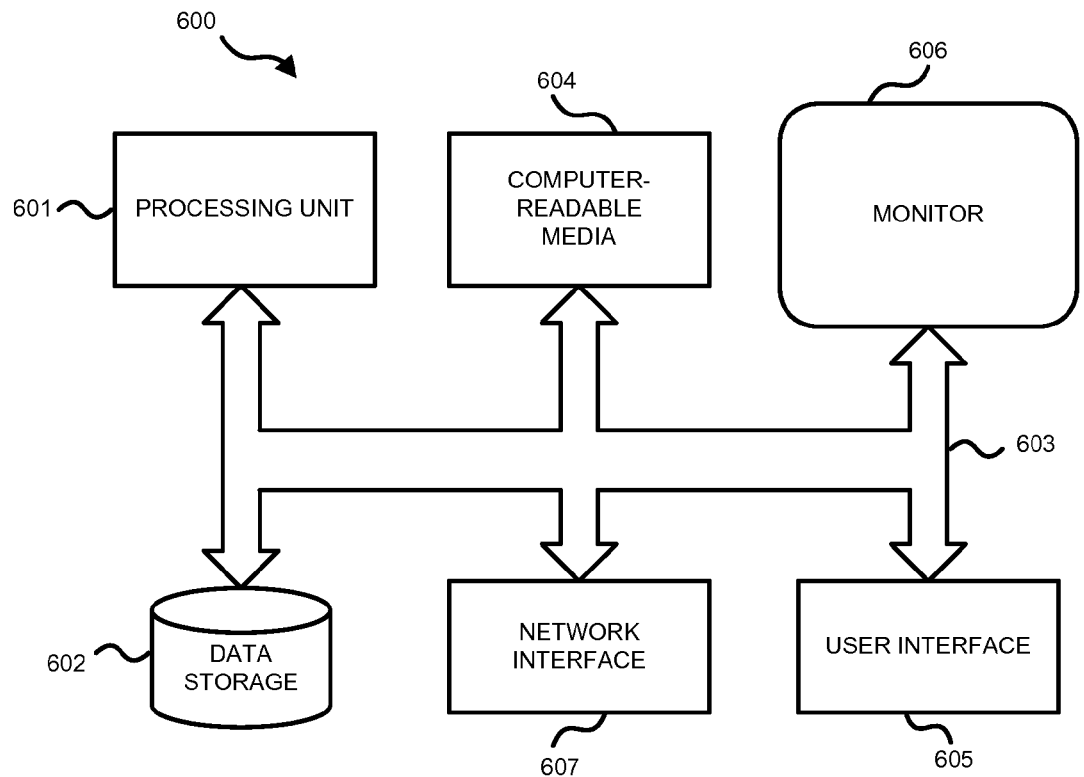
FIG. 6 illustrates an example of a computing and networking environment for updating a host operating system according to one embodiment.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 600. Components may include, but are not limited to, various hardware components, such as processing unit 601, data storage 602, such as a system memory, and system bus 603 that couples various system components including the data storage 602 to the processing unit 601. The system bus 603 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 typically includes a variety of computer-readable media 604. Computer-readable media 604 may be any available media that can be accessed by the computer 600 and includes both volatile and nonvolatile media, and removable and non-removable media, but excludes propagated signals. By way of example, and not limitation, computer-readable media 604 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 600. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 602 includes computer storage media in the form of volatile and/or nonvolatile memory such as read only memory (ROM) and random access memory (RAM). A basic input/output system (BIOS), containing the basic routines that help to transfer information between elements within computer 600, such as during start-up, is typically stored in ROM. RAM typically contains data and/or program modules that are immediately accessible to and/or presently being operated on by processing unit 601. By way of example, and not limitation, data storage 602 holds an operating system, application programs, and other program modules and program data.

Data storage 602 may also include other removable/non-removable, volatile/nonvolatile computer storage media. By way of example only, data storage 602 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 605 or input device. The user input interface 605 may be coupled to the system bus 603, but may be connected by other interface and bus structures. A monitor 606 or other type of display device may also be connected to the system bus 603 via an interface, such as a video interface.

The computer 600 may operate in a networked or cloud-computing environment using logical connections 607 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public or private network through a network interface or adapter 607. In some embodiments, a modem or other means for establishing communications over the network. The modem, which may be internal or external, may be connected to the system bus 603 via the network interface 607 or other appropriate mechanism. A wireless networking component such as comprising an interface and antenna may be coupled through a suitable device such as an access point or peer computer to a network. In a networked environment, program modules depicted relative to the computer 600, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving a copy of an updated host operating system on a computer system;
   suspending all virtual machines running on the computer system;
   recording resource allocation information and a state for each of the virtual machines;
   transferring execution from the active host operating system to a loader;
   reading a kernel of updated host operating system into RAM via the loader;
   loading the resource allocation information and state for each of the virtual machines; and
   resuming operation of the virtual machines by the updated host operating system.

2. The computer-implemented method of claim 1, further comprising:
   leaving the virtual machines resident in RAM when the virtual machines are suspended.

3. The computer-implemented method of claim 1, further comprising:
   recording the resource allocation information and state for the virtual machines to RAM or to local storage.

4. The computer-implemented method of claim 1, wherein transferring execution from the active host operating system to the loader further comprises:
   shutting down the active host operating system.

5. The computer-implemented method of claim 4, further comprising:
   transferring execution from the active host operating system to the loader as part of the active host operating system shut down, wherein the loader executes in place of rebooting the computer system.

6. The computer-implemented method of claim 1, wherein loading the resource allocation information and state for each of the virtual machines further comprises:
   loading instructions to resume the virtual machines.

7. The computer-implemented method of claim 1, further comprising:
   maintaining virtual machine caches while the virtual machines are suspended.

8. A computer system, comprising:
   a processor;
   system memory;
   one or more computer-readable storage media having stored thereon computer-executable instructions that, when executed by the processor, causes the processor to perform a method for updating a host operating system, the processor operating to:
      load an updated host operating system to the system memory;
      suspend virtual machines running on the computer system;
      store resource allocation information and a state for each of the virtual machines to the system memory;
      shut down the active host operating system;
      transfer execution from the active host operating system to a loader;
      load a kernel of updated host operating system into the system memory via the loader;
      initialize the updated host operating system;
      load the resource allocation information and state for each of the virtual machines; and
      resume operation of the virtual machines by the updated host operating system.

9. The computer system of claim 8, the processor further operating to:
   maintaining the virtual machines resident in system memory when the virtual machines are suspended.

10. The computer system of claim 8, wherein the system memory is RAM.

11. The computer system of claim 8, the processor further operating to:
    transfer execution from the active host operating system to the loader as part of the active host operating system shut down, wherein the loader executes in place of rebooting the computer system.

12. The computer system of claim 8, wherein loading the resource allocation information and state for each of the virtual machines further comprises:
    loading instructions to resume the virtual machines.

13. The computer system of claim 8, the processor further operating to:
    maintain virtual machine caches while the virtual machines are suspended.

14. The computer system of claim 8, wherein the computer system is a resource on a distributed computing environment, and wherein the updated host operating system is loaded from the distributed computing environment.

15. A computer program product for implementing a method for updating a host operating system, the computer program product comprising one or more computer-readable storage media having stored thereon computer-executable instructions that, when executed by one or more processors of a computer system, cause the computer system to perform the method comprising:
    receiving an updated host operating system;
    suspending all virtual machines running on the computer system;
    recording resource allocation information and a state for each of the virtual machines; transferring execution from the active host operating system to a loader;
    reading a kernel of updated host operating system into RAM via the loader;
    loading the resource allocation information and state for each of the virtual machines; and
    resuming operation of the virtual machines by the updated host operating system.

16. The computer program product of claim 15, the method further comprising:

leaving the virtual machines resident in RAM when the virtual machines are suspended.

17. The computer program product of claim 15, the method further comprising:

recording the resource allocation information and state for the virtual machines to RAM or to local storage.

18. The computer program product of claim 15, wherein transferring execution from the active host operating system to the loader further comprises:

shutting down the active host operating system.

19. The computer program product of claim 15, the method further comprising:

transferring execution from the active host operating system to the loader as part of the active host operating system shut down, wherein the loader executes in place of rebooting the computer system.

20. The computer program product of claim 15, wherein loading the resource allocation information and state for each of the virtual machines further comprises:

loading instructions to resume the virtual machines.

\* \* \* \* \*